(12) United States Patent
Shinoda et al.

(10) Patent No.: US 6,372,844 B1
(45) Date of Patent: Apr. 16, 2002

(54) RESIN COMPOSITION

(75) Inventors: Hosei Shinoda, Kanagawa; Yukiko Asou; Hiroaki Tamatani, both of Chiba, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/536,677

(22) Filed: Mar. 28, 2000

(30) Foreign Application Priority Data

Mar. 31, 1999 (JP) ............................................ 11/090453

(51) Int. Cl.$^7$ ......................... C08L 51/08; C08L 23/02; C08L 67/00; C08G 73/16; C08G 69/44
(52) U.S. Cl. ...................... 525/63; 525/92 A; 525/92 B; 525/92 L
(58) Field of Search ................. 525/63, 92 A, 525/92 B, 92 L

(56) References Cited

U.S. PATENT DOCUMENTS 5,654,381 A    8/1997  Hrkach et al.
6,093,792 A  * 7/2000  Gross et al. ................. 528/354

FOREIGN PATENT DOCUMENTS

| EP | 588253 A2 | 3/1994 |
|---|---|---|
| EP | 926185 A1 | 6/1999 |
| WO | WO97/12938 | 4/1997 |

OTHER PUBLICATIONS

G. L. Jain et al, "Synthesis and Characterization of Random Copolymers of Aspartic Acid with Lactic Acid and Glycolic Acid", Makromol. Chem. vol. 182, pp. 2557–2561, 1981.

* cited by examiner

*Primary Examiner*—Jeffrey Mullis
(74) *Attorney, Agent, or Firm*—Burns, Doane, Swecker & Mathis, L.L.P.

(57) ABSTRACT

There are here disclosed a resin composition comprising a block or a graft copolymer (A) having a polyamino acid as a hydrophilic segment (a-1), and a degradable polymer as a hydrophobic segment (a-2), and a resin (B); and a method of accelerating the hydrolysis of a resin and inhibiting the heat deterioration thereof by mixing this copolymer (A) with the resin (B).

11 Claims, No Drawings

RESIN COMPOSITION

BACKGROUND OF THE INVENTION

1. Field of the Invention

The present invention relates to a novel resin composition wherein a resin additive itself has degradability. The resin composition of the present invention is a novel resin composition having improved wettability, and is especially useful as a degradable plastic or a bioabsorbable plastic which can be degraded under a natural environment or in a living body. Furthermore, the present invention relates to a method for accelerating the hydrolysis of a resin such as an aliphatic polyester, and a method for inhibiting its heat deterioration.

2. Description of the Related Art

Polyhydroxycarboxylic acids typified by polylactic acid (PLA), polyglycolic acid (PGA), polycaprolactone (PCL) and the like are utilized as biodegradable plastics which can be degraded by water, an enzyme and the like under a natural environment of in a living body.

Moreover, Japanese Application Laid-Open No. 64824/1987, for example, discloses a method for obtaining a lactic acid-glycolic acid copolymer (PLGA) useful as a base material for a slowly releasable agent and having a low molecular weight and a polydispersity by the ring-opening polymerization of glycolide (GLD) which is a cyclic dimer of glycolic acid and lactide (LTD) which is a cyclic dimer of lactic acid.

In recent years, as global environment is getting worse, much attention is increasingly paid to the recycling of resins and the use of additives which are safe for living bodies and less harmful to the global environment. In addition, with the diversification of consumer's needs, demands for biodegradable plastics such as polyhydroxycarboxylic acids also increase. For example, a phthalic ester-based plasticizer which is one of resin plasticizers is considered as an endocrine disrupting substance (an environmental hormone), and thus its safety is insufficient. Accordingly, it is proposed to restrict the use of the phthalic ester-based plasticizers, and for the replacement of these plasticizers, research has been conducted for safer resin additives.

For example, PLA is utilized as a material for disposable containers, packaging materials and the like owing to its good processability and the excellent mechanical strength of its molded products. However, PLA has a disadvantage that its degradation velocity is relatively slow under conditions (e.g., in sea water, soil or the like) other than in compost, and hence PLA can scarcely be used in a field where it is desired that PLA degrades and vanishes within several months.

Accordingly, in order to accelerate the hydrolysis of PLA, mixing a hydrophilic additive such as polyethylene glycol can also be conceived. However, PLA is less hydrophilic, and for this reason, it is scarcely compatible to a hydrophilic substance such as polyethylene glycol. Therefore, the additive tends to bleed out during molding or after molding, the mechanical strength of molded articles decreases, and appearance such as transparency is impaired. In consequence, such a conception is not practical.

So far as the inventors know, there has not been found yet, for example, a method which comprises adding an additive to an aliphatic polyester such as PLA to effectively accelerate degradability without remarkably impairing the properties of the aliphatic polyester (mechanical strength, appearance and the like).

On the other hand, also in the field of the slowly releasable agents, there is highly required a product that can slowly release an agent within a relatively short period of time. With regard to PLA, its degradation in a body is too slow, so that it remains in the boy for a long time after the agent has been released, which is not preferable. Therefore, a product having a high degradation velocity has been investigated, for example, by using PLGA of a low molecular weight instead of PLA. However, PLGA still is not all-purpose, and some problems are indicated, for example, as follows.

(1) PLGA is amorphous and has a glass transition temperature (Tg) of around 30 to 40° C., and therefore, a product containing it softens and adhesively melts in summer season.

(2) In manufacturing a product by adding a hydrophobic agent, an incorporation ratio of the agent (the content of the agent in the product) does not increase.

(3) Since PLGA is a copolymer, the scattering of quality occurs between lots in a polymer production process.

Accordingly, it would be an important contribution in the field of the slowly releasable agent to realize the acceleration of the biodegradation of a crystalline and hydrophobic homopolymer such as PLA. Namely, a method for accelerating the degradation of an aliphatic polyester is desired also in an application where it is used in a living body.

Furthermore, in the case of an aliphatic polyester such as PLA, especially a high-molecular weight polymer, it is known that the remarkable decrease of the molecular weight occurs by heating during molding. However, an effective method for inhibiting the heat deterioration of the aliphatic polyester has not been developed yet.

SUMMARY OF THE INVENTION

An objective of the present invention is to provide a novel resin composition wherein hydrolysis is accelerated and heat deterioration is inhibited.

Another objective of the present invention is to provide a method capable of blending an additive with a resin without separation and also capable of accelerating the hydrolysis of a resin such as an aliphatic polyester or inhibiting the heat deterioration of the same by the function of the additive.

As a result of intensive studies for achieving the above objectives, the present inventors have found that when a copolymer having a hydrophilic segment and a hydrophobic segment is mixed with a resin such as a polyester, they can be mixed without separation and also the wettability of the resin can be enhanced, whereby hydrolysis can be accelerated. Furthermore, they have also found that when the copolymer is mixed with a resin such as, especially, a polyhydroxycarboxylic acid, remarkable effects can be exerted. That is to say, a degradation rate can be increased and heat deterioration during heating can be inhibited without impairing the properties of the polyhydroxycarboxylic acid.

Namely, a first aspect of the present invention is directed to a resin composition comprising a block or a graft copolymer (A) having a polyamino acid as a hydrophilic segment (a-1) and a degradable polymer as a hydrophobic segment (a-2), and a resin (B).

Furthermore, a second aspect of the present invention is directed to a method for accelerating the hydrolysis of a resin which comprises the step of mixing 1 to 50% by weight of a copolymer (A) having a weight-average molecular weight of 1000 to 100000 with a resin (B) having a weight-average molecular weight of 3000 to 500000.

A third aspect of the present invention is directed to a method for inhibiting the heat deterioration of a resin.

DETAILED DESCRIPTION OF THE PREFERRED EMBODIMENTS

A resin composition of the present invention comprises a block or a graft copolymer (A) and a resin (B).

Typical examples of the resin (B) for use in the present invention includes, but are not limited to, the following resins including degradable resins.

1. Polyolefin-based resins

High density polyethylene, low density polyethylene, linear low density polyethylene, polypropylene, polyisopropylene, polyisobutylene, polybutadiene, and the like; homopolymers and copolymers synthesized from one or more of olefin monomers such as ethylene, propylene and butylene; copolymers with any other monomers; and mixtures thereof.

2. Polystyrene-based resins

Polystyrene, acrylonitrile-butadiene-styrene copolymer and the like; homopolymers and copolymers synthesized from one or more of styrene-based monomers; copolymers with any other monomers; and mixtures thereof.

3. Polycarbonates

Homopolymers and copolymers synthesized from one or more of polyoxymethylene, polybutylene terephthalate, polyethylene terephthalate, polyphenylene oxide and the like; copolymers with the any other monomers; and mixtures thereof.

4. Degradable resins 4-1. Aliphatic polyesters (1) Polyhydroxylcarboxylic acids

Homopolymers and copolymers synthesized from one or more of hydroxycarboxylic acids such as α-hydroxymonocarboxylic acids (e.g., glycolic acid, lactic acid, 2-hydroxybutyric acid, 2-hydroxyvaleric acid, 2-hydroxycaproic acid and 2-hydroxycapric acid), hydroxydicarboxylic acids (e.g., malic acid), hydroxytricarboxylic acids (e.g., citric acid); copolymers with any other monomers; and mixtures thereof.

(2) Polylactides

Homopolymers and copolymers synthesized from one or more of lactides such as glycolide, lactide, benzylmalolactonate, malide benzyl ester and 3-[(benzyloxycarbonyl)methyl]-1,4-dioxan-2,5-dione; copolymers with any other monomers; and mixtures thereof.

(3) Polylactones

Homopolymers and copolymers synthesized from one or more of lactones such as β-propiolactone, δ-valerolactone, ε-caprolactone and N-benzyloxycarbonyl-L-serin-β-lactone; copolymers with any other monomers; and mixtures thereof. Especially, they may each copolymerize with glycollide or lactide which is a cyclic dimer of an α-hydroxy acid.

4-2. Polyanhydrides

For example, poly[1,3-bis(p-carboxyphenoxy)methane] and poly(terphthalic acid-sebacic anhydride).

4-3. Degradable polycarbonates

For example, poly(oxycarbonyloxyethylene) and spiroorthopolycarbonate.

4-5. Polyorthoesfers

For example, poly(3,9-bis(ethylidene)-2,4,8,10-tetraoxaspiro [5.5] undecan-1,6-hexandiol).

4-6. Poly-α-cyanoacrylic esters

For example, poly (isobutyl α-cyanoacrylate).

4-7. Polyphosphazenes

For example, polydiaminophosphazene.

4-8. Other degradable resins

Synthetic resins typified by polyhydroxyesters which can be produced with the aid of microorganisms; and resins to which degradability is imparted by blending each resin with starch, modified starch, skin powder, pulverized cellulose or the like.

Among the above-mentioned various resins, the polyolefin-based resins, the polycarbonates and the degradable resins are preferable, and the degradable resins are especially preferable in that the copolymer (A) and the resin (B) can more homogeneously be mixed without separation. Among the degradable resins, the aliphatic polyesters, the polyactides and the polylactones are preferable, the aliphatic polyesters are more preferable, and the polyhydroxycarboxylic acids are most preferable, from the viewpoint of compatibility with the copolymer (A).

In the present invention, the polyhydroxycarboxylic acid means a polymer or a copolymer of a hydroxycarboxylic acid having both of a hydroxyl group and a carboxyl group. As the hydroxycarboxylic acids, preferable are lactic acid, glycolic acid, hydroxycaproic acid, hydroxybutanoic acid, hydroxypropionic acid and the like. In the polyhydroxycarboxylic acid, a constitutional moiety (a copolymerized unit) other than the hydroxycarboxylic acid may be present. However, in the polyhydroxycarboxylic acid, a ratio of the constitutional unit derived from the hydroxycarboxylic acid is preferably 20 mol % or more, more preferably 50 mol % or more.

The polyhydroxycarboxylic acids which can most suitably be used include polylactic acid, lactic acid-glycolic acid copolymer and polycaprolactone.

In the present invention, the molecular weight of the resin (B) is not particularly limited. Nevertheless, in view of the easiness of mixing with the copolymer (A), the weight-average molecular weight of the resin (B) is preferably within the range of 1000 to 1000000, more preferably 3000 to 500000.

The copolymer (A) which can be used in the present invention is a block or a graft copolymer having a polyamino acid as a hydrophilic segment (a-1) and a degradable polymer as a hydrophobic segment (a-2).

In the present invention, "the hydrophobic segment" means a degradable polymer which is sparingly soluble or insoluble especially in water, or a segment derived from this polymer, and it is less hydrophilic than the hydrophilic segment. "The hydrophilic segment" means a polymer which is soluble in water or which is more hydrophilic than the hydrophobic segment even if it is sparingly soluble in water, or a segment derived from this polymer.

A preferable embodiment of the hydrophilic segment (a-1) of the copolymer (A) is constituted of a constitutional unit derived from aspartic acid, and a preferable embodiment of the hydrophobic segment (a-2) is constituted of a constitutional unit derived from the following hydroxycarboxylic acids, polylactides, polylactones or carbonates.

(1) Hydroxycarboxylic acids

α-Hydroxymonocarboxylic acids (e.g., glycolic acid, lactic acid, 2-hydroxybutyric acid, 2-hydroxyvaleric acid, 2-hydroxycaproic acid and 2-hydroxycapric acid); hydroxydicarboxylic acids (e.g., malic acid); hydroxytricarboxylic acids (e.g., citric acid); and the like.

(2) Lactides

For example, glycolide, lactide, p-dioxanone, 1,4-benzylmalolactonate, malite benzyl ester, 3-[(benzyloxycarbonyl)methyl]-1,4-dioxane-2,5-dione and tetramethyl glycolide.

(3) Lactones

For example, β-propiolactone, β-butyrolactone, α,α-bischloromethylpropiolactone, γ-butyrolactone, γ-valerolactone, δ-valerolactone, 3-n-propyl-δ- valerolactone, 6,6-dimethyl-δ-valerolactone, 3,3,6-trimethyl-1,4-dioxan-dione, ε-caprolactone, dioxepanone, 4-methyl-7-isopropyl-ε-caprolactone and N-benzyloxycarbonyl-L-serin-β-lactone.

(4) Carbonates

For example, ethylene carbonate, tetramethylene carbonate, trimethylene carbonate, neopentylene carbonate, ethylene oxolate and propylene oxolate.

Furthermore, acids containing one or more selected from the group consisting of the above hydroxycarboxylic acids as well as lactides and lactones derived from the hydroxycarboxylic acids are generally called hydroxycarboxylic acids. In addition, glycolic acid, lactic acid, 2-hydroxybutyric acid, 2-hydroxyvaleric acid, 2-hydroxycaproic acid and the like mentioned above are especially generally called α-hydroxycarboxylic acids.

A preferable embodiment of the hydrophobic segment (a-2) of the copolymer (A) is a constitutional unit derived from a hydroxycarboxylic acid. Especially, it is preferable to use an α-hydroxycarboxylic acid, glycolide, lactide, p-dioxanone, β-propiolactone, β-butyrolactone, δ-valerolactone or ε-caprolactone. Among them, more preferable is to use glycolic acid, lactic acid, glycolide, lactide or ε-caprolactone.

As the copolymer (A) of the present invention, an aspartic acid hydroxycarboxylic acid copolymer is preferable. This copolymer can be obtained by the copolymerization of aspartic acid with a hydroxycarboxylic acid or lactide, glycolide, p-dioxanone, β-propiolactone, β-butyrolactone, δ-valerolactone, ε-caprolactone or the like. In the structure of the aspartic acid-hydroxycarboxylic acid copolymer, there coexist at least a constitutional unit derived from aspartic acid and a constitutional unit derived from the hydroxycarboxylic acid. The copolymer preferably contains 1 mol % or more of the constitutional unit derived from aspartic acid and 1 mol % or more of the constitutional unit derived from the hydroxycarboxylic acid. Aspartic acid can dehydrate/condense to form a polymer having a succinimide unit, and so the constitutional unit derived from aspartic acid also may include such a succinimide unit.

The succinimide unit means the constitutional unit represented by the following formula (1):

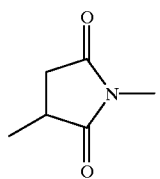

(1)

The composition ratio of the unit derived from aspartic acid to the unit derived from the hydroxycarboxylic acid in the aspartic acid-hydroxycarboxylic acid copolymer is preferably within a range of 1/1 to 1/50.

In order to form the constitutional unit derived from the hydroxycarboxylic acid in the aspartic acid-hydroxycarboxylic acid copolymer, it is preferable to use at least one selected from the group consisting of an α-hydroxycarboxylic acid, glycolide, lactide, p-dioxanone, β-propiolactone, β-butyrolactone, δ-valerolactone and ε-caprolactone. It is more preferable to use at least one selected form the group consisting of glycolic acid, lactic acid, glycolide, lactide, p-dioxanone, 2-hydroxybutyric acid, 2-hydroxyvaleric acid, 2-hydroxycaproic acid, β-propiolactone, β-butyrolactone, δ-valerolactone and ε-caprolactone. It is particularly preferable to use at least one selected from the group consisting of clycolic acid, lactic acid, glycolide, lactide and ε-caprolactone. Most preferable is to use lactic acid.

The aspartic acid-hydroxycarboxylic acid copolymer may contain a constitutional unit other than aspartic acid and the hydroxycarboxylic acid as a result of the copolymerization. However, the amount of the other constitutional unit is required to be such a level as not to seriously impair the properties of the aspartic acid-hydroxycarboxylic acid copolymer. In view of this point, the amount of the other constitutional unit should be about 20 mol % or less.

A method for producing the aspartic acid-hydroxycarboxylic acid copolymer is not particularly limited. Usually, the copolymer can be obtained by mixing aspartic acid with the hydroxycarboxylic acid in a desired ratio, followed by dehydration/condensation with heating under a reduced pressure. Alternatively, it can also be obtained by reacting aspartic acid with a cyclic anhydride compound of a hydroxycarboxylic acid such as lactide (LTD), glycolide (GLD) or caprolactone (CL).

The preferable aspartic acid-hydroxycarboxylic acid copolymer in the present invention can be obtained by heating a mixture of aspartic acid and one or more compounds selected from the group consisting of lactide, glycolide, lactic acid and glycolic acid. The resultant copolymer is a copolymer having both of at least a succinimide unit and/or an aspartic acid unit, and a lactic acid unit and/or a glycolic acid unit as repeating units.

The resin composition of the present invention can be obtained by, for example, mixing the aspartic acid-hydroxycarboxylic acid copolymer having a weight-average molecular weight of 1000 to 100000 with the polyhydroxycarboxylic acid having a weight-average molecular weight of 3000 to 500000. A composition ratio of these materials is preferably 0.01 to 3300 parts by weight of the aspartic acid-hydroxycarboxylic acid copolymer to 100 parts by weight of the polyhydroxycarboxylic acid. When the composition ratio of the aspartic acid-hydroxycarboxylic acid copolymer is too high, a thermoplastic resin composition having a high degradation rate is obtained. When the composition ratio of the aspartic acid-hydroxycarboxylic acid copolymer to the polyhydroxycarboxylic acid is too low, it is difficult to expect an effect of accelerating the degradation rate of the polyhydroxycarboxylic acid and an effect of inhibiting the heat deterioration thereof.

When a composition that does not seriously impair the properties of the polyhydroxycarboxylic acid is desired, the composition ratio by weight of the aspartic acid-hydroxycarboxylic acid copolymer to the polyhydroxycarboxylic acid is preferably adjusted to a range of about 1/99 to 33/67.

As described above, mixing 1 to 50% by weight of the aspartic acid-hydroxycarboxylic acid copolymer with the resin (the polyhydroxycarboxylic acid or the like) permits the acceleration of the hydrolysis of the resin and the inhibition of the heat deterioration of the resin.

No particular restriction is put on a technique for mixing the aspartic acid-hydroxycarboxylic acid copolymer with the polyhydroxycarboxylic acid. Preferably, both the compounds are heated/melted, or they are dissolved in a solvent and then stirred/mixed.

Both the compounds are well compatible with each other owing to a hydroxycarboxylic acid segment present in the aspartic acid-hydrocarboxylic acid copolymer. For example, when 5 parts by weight of the aspartic acid-lactic acid copolymer having a copolymer composition ratio of aspartic acid to lactic acid of 1/5 and a weight-average molecular weight of 20000 are added to 95 parts by weight of PLA having a weight-average molecular weight of about 150000 and they are then melted and mixed at 200° C. by the use of a small-sized kneader, both the materials are well compatible with each other. The resultant mixture is then subjected to processing such as pressing to obtain a film having a transparency similar to that of a PLA film. The thus obtained film shows about the same mechanical strength properties (tensile strength, elongation, elasticity modulus, etc.) as that of the PLA film.

For instance, in the case of the PLA film having a weight-average molecular weight of about 150000, its mechanical strength properties and appearance scarcely change even after it is immersed in neutral water at 37° C. for about 5 months. On the other hand, the film obtained from the resin composition of the present invention within the above-mentioned range whitens after about 1 month under the same conditions, and the strength of the film becomes 0 and the molecular weight thereof decreases to 20000 or less after about 5 months.

Furthermore, for example, when 5 parts by weight of polyaspartic acid or 5 parts by weight of polysuccinimide are added to 95 parts by weight of PLA and mixing is then tried by means of a kneader in the same manner as above, both the compounds are not compatible with each other, so that even after pressing, a non-homogeneous and opaque film having a low strength is merely obtained.

It is known that the polyhydroxycarboxylic acid is labile to heat and therefore its molecular weight is prone to decrease by heating during molding such as kneading or injection. Surprisingly, when the aspartic acid-hydroxycarboxylic acid copolymer is mixed with the polyhydroxycarboxylic acid, the heat deterioration can be inhibited.

Furthermore, for example, in the case that PLA having a weight-average molecular weight of 280000 is melted at 220° C. in air, this molecular weight decreases to 140000, a weight loss of 5.6% after 1 hour, and to 60000 and 40000 after 2 hours and 3 hours, respectively. On the other hand, in the case that 5 parts by weight of the aspartic acid-lactic acid copolymer having a weight-average molecular weight of 20000 and a copolymer composition ratio of aspartic acid to lactic acid of 1/5 are added to 95 parts by weight of PLA having the same weight-average molecular weight of 280000 and they are then mixed, even when the resultant mixture is heated/melted under the same conditions, the molecular weight and the weight loss of the PLA after 1 hour are 210000 and 0.4%, respectively. Even after 2 hours and 3 hours, the molecular weights are 180000 and 130000, respectively. Accordingly, the effect of suppressing the heat deterioration can be apparently confirmed.

The aspartic acid-hydroxycarboxylic acid copolymer is typically a polymer, having as aspartic acid unit and a lactic acid unit and/or a glycolic acid unit as repeating units, which can be obtained by ring-opening a succinimide unit by hydrolysis, this succinimide unit being a constitutional unit of a copolymer formed by heating a mixture of aspartic acid and lactide and/or glycolide. A carboxyl group at a molecular chain end of the polymer is not necessarily a COOH group, and at this chain end, there may be formed a salt of a base such as an alkaline metal, an alkaline earth metal or an amine.

With respect to a copolymer, having at least a succinimide unit and/or an aspartic acid unit as well as a lactic acid unit and/or a glycolic acid unit as repeating units, which can be obtained by heating a mixture of aspartic acid and at least one compound selected from the group consisting of lactide, glycolide, lactic acid and glycolic acid, the structure of this copolymer can be confirmed by a known analytical technique such as the measurement of a nuclear magnetic resonance (NMR) spectrum and the measurement of an infrared absorption (IR) spectrum. and the measurement of an infrared absorption (IR) spectrum.

The aspartic acid unit contained in the structure of the aspartic acid-hydroxycarboxylic acid copolymer may be a mixture of an α-amide type monomer unit and a β-amide type monomer unit, and a ratio of both the units is not particularly limited.

The molecular weight of the aspartic acid-hydroxycarboxylic acid copolymer is preferably in a range of about 1000 to 100000 in terms of weight-average molecular weight in view of good mixing with a polyhydroxycarboxylic acid as well as the increase of the degradation accelerating effect and the heat deterioration inhibiting effect.

In the present invention, it is considered that the reason for the degradation accelerating effect is that the wettability of the resin composition is enhanced by mixing the copolymer (A) with the resin (B). The enhancement of the wettability can be judged by determining contact angles to water drops on a film made of a resin composition containing the copolymer (A) and the resin (B), and a film made of the resin (B) alone. In this case, the resin film may be any of a cast film, a thermally pressed film, a stretched film and the like. When the contact angles are compared before and after the addition of the copolymer (A), and if a difference between the contact angles is 2° or more, it can be judged that the wettability of the resin is enhanced. If the difference is 40° or more, it can be judged that the wettability is very enhanced.

Next, the present invention will be described in detail in accordance with some examples. Incidentally, physical properties and the like shown in the examples were determined as follows.

[1] Weight-average molecular weight (Mw) and molecular weight distribution (Mw/Mn) of a polymer A sample was dissolved in dimethylformamide (DMF) or chloroform (concentration=0.5% by weight), and a weight-average molecular weight (hereinafter referred to as "Mw") and a molecular weight distribution (hereinafter referred to as "Mw/Mn") of the polymer were determined by means of gel permeation chromatography (hereinafter referred to as "GPC"). As a reference, polystyrene was used.

[2] Infrared absorption (IR) spectrum

A polymer sample powder was sufficiently mixed with a KBr powder, and the resultant powder mixture was then pressed under degassing to form a pellet. A spectrum was measured by means of an ET-IR apparatus.

[3] Nuclear magnetic resonance spectrum (NMR spectrum)

A sample was dissolved in deuterated dimethyl sulfoxide (concentration=7% by weight), and H-NMR (400 MHz) and C-NMR (100 MHz) spectra were measured at room temperature by the use of a nuclear magnetic resonance apparatus.

[4] Tensile strength, tensile modulus of elasticity, elongation at breaking of a film A film stamped out in a dumbbell shape was drawn at a tensile rate of 20 mm/min by the use of a tensile testing machine to measure stresses, thereby obtaining tensile strength at breaking, tensile modulus of elasticity, and elongation at breaking.

[5] Evaluation of mixing state of component A and component B

A mixing state of a component A and a component B in a formed film was judged in the following manner.

⊚: The components A and B were mixed homogeneously and transparently without separation.

○: The components A and B were mixed homogeneously without separation.

Δ: The components A and B were mixed without separation.

PREPARATION EXAMPLE 1

13.3 g (0.1 mol) of L-aspartic acid and 28.8 g (0.2 mol) of L-lactide were weighed, and they were then placed in a glass reactor equipped with a stirrer and a degassing orifice. In this case, the molar ratio of aspartic acid and lactic acid placed therein was 1:4. The reactor was immersed in an oil bath at 180° C., followed by stirring. In a condition where lactide having a melting point of 98° C. was melted and the white powder of insoluble aspartic acid was floating, heating was continued. The powder gradually disappeared in about 30 minutes to 1 hour, and the viscosity of the yellow reaction solution increased. After 1.5 hours from the start of the heating, the pressure of the reaction system was gradually reduced and reached 1 mmHg after 2 hours. After the heating was further continued for 2 hours, the reactor was taken out of the oil bath, and the reaction solution was taken out and then cooled/solidified. The resultant lightly yellowish brown transparent solid was pulverized to obtain a powdery polymer. According to DMF-based GPC, the Mw and Mw/Mn of the polymer were 6500 and 7.4, respectively.

10 g of this polymer were dissolved in 20 g of DMF, and the solution was then poured into 400 ml of water. The resultant precipitate was collected, thereby purifying the polymer. A purification yield was 81%. The Mw and Mw/Mn of the purified polymer were 9400 and 1.22, respectively.

According to the results of NMR measurement, the composition ratio of a unit derived from aspartic acid (an aspartic acid unit and a succinimide unit) to a lactic acid unit in the polymer was 1:3.9.

On the basis of the analysis of NMR and IR spectra, it was presumed that the structure of the obtained polymer was as shown by the following formula (16). However, it was also presumed that the succinimide unit in the chemical structure was partially ring-opened, and hence, in the above polymer, a polymer represented by the structure of the formula (17) or the formula (18) was included:

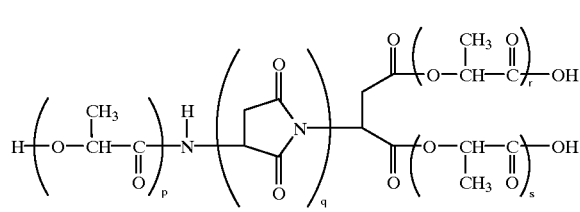

(16)

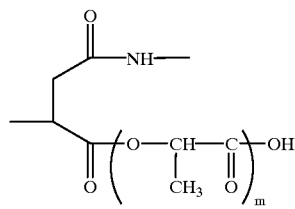

(17)

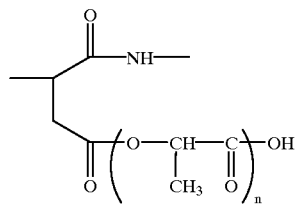

(18)

in the formula (14), p, q, r and s are each 0 or a positive integer; and in the formulae (15) and (16), m and n are each 0 or a positive integer.

PREPARATION EXAMPLE 2

13.3 g (0.1 mol) of L-aspartic acid and 36.0 g (0.25 mol) of L-lactide were weighed, and they were then placed in a glass reactor equipped with a stirrer and a degassing orifice. In this case, the molar ratio of aspartic acid and lactic acid placed therein was 1:5. The reactor was immersed in an oil bath at 180° C., followed by stirring. In a condition where lactide having a melting point of 98° C. was melted and the white powder of insoluble aspartic acid was floating, heating was continued. The powder gradually disappeared in about 30 minutes to 1 hour, and the viscosity of the yellow reaction solution increased. After 1.5 hours from the start of the heating, the pressure of the reaction system was gradually reduced and reached 1 mmHg after 2 hours. After the heating was further continued for 2 hours, the temperature of the oil bath was lowered to 160° C., and the reaction was further continued for 15 hours. The reactor was taken out of the oil bath, and the reaction solution was taken out and then cooled/solidified. The resultant lightly yellowish brown transparent solid was pulverized to obtain a powdery polymer. According to DMF-based GPC, the Mw and Mw/Mn of the polymer were 14700 and 1.38, respectively.

10 g of this polymer were dissolved in 20 g of DMF, and the solution was then poured into 400 ml of water. The resultant precipitate was collected, thereby purifying the polymer. A purification yield was 94%. The Mw and Mw/Mn of the purified polymer were 16300 and 1.37, respectively.

According to the results of NMR measurement, the composition ratio of a unit derived from aspartic acid to a lactic acid unit in the polymer was 1:5.1.

PREPARATION EXAMPLE 3

13.3 g (0.1 mol) of L-aspartic acid and 40 g (0.4 mol) of a 90% aqueous L-lactic acid solution were weighed, and they were then placed in a glass reactor equipped with a stirrer and a degassing orifice. In this case, the molar ratio of aspartic acid and lactic acid placed therein was 1:4. The reactor was immersed in an oil bath at 180° C., followed by stirring.

The white powder of aspartic acid was immediately dissolved, and the reaction solution became lightly yellow transparent. After 1.5 hours from the start of heating, the pressure of the reaction system was gradually reduced and reached 1 mmHg after 2 hours. The heating was further continued for 2 hours. The reactor was taken out of the oil bath, and the reaction solution was taken out and then cooled/solidified. The resultant lightly yellowish brown transparent solid was pulverized to obtain a powdery polymer. According to DMF-based GPC, the Mw and Mw/Mn of the polymer were 3400 and 12.6, respectively.

PREPARATION EXAMPLE 4

6.7 g (0.05 mol) of L-aspartic acid and 36.0 g (0.25 mol) of L-lactide were weighed, and they were then placed in a glass reactor equipped with a stirrer and a degassing orifice. In this case, the molar ratio of aspartic acid and lactic acid placed therein was 1:10. The reactor was immersed in an oil bath at 180° C., followed by stirring. In a condition where lactide having a melting point of 98° C. was melted and the white powder of insoluble aspartic acid was floating, heating was continued. The powder gradually disappeared in about 1 hour, and the viscosity of the yellow reaction solution increased. After a lapse of 2.5 hours from the start of the heating, the pressure of the reaction system was gradually reduced and reached 1 mmHg after 3 hours. The temperature of the oil bath was lowered to 160° C., and the reaction was further continued for 30 hours. After the completion of the reaction, the reactor was taken out of the oil bath, and the reaction solution was taken out and then cooled/solidified. The resultant lightly yellowish brown transparent solid was pulverized to obtain a powdery polymer. According to DMF-based GPC, the Mw and Mw/Mn of the polymer were 34000 and 1.44, respectively.

10 g of this polymer were dissolved in 20 g of DMF, and the solution was then poured into 400 ml of water. The resultant precipitate was collected, thereby purifying the polymer. A purification yield was 95%. The Mw and Mw/Mn of the purified polymer were 36000 and 1.32, respectively.

According to the results of NMR measurement, the composition ratio of a unit derived from aspartic acid to a lactic acid unit in the polymer was 1:10.4.

PREPARATION EXAMPLE 5

In 150 ml of distilled water were suspended 4.21 g of the polymer powder obtained in Preparation Example 1. The pH of the suspension was 4. While the suspension was stirred and its pH was observed, a 1N aqueous sodium hydroxide solution was slowly added dropwise thereto. The pH of the solution rose from 4 to 9 every time the aqueous sodium hydroxide solution was added dropwise, but it rapidly lowered to 4. As the amount of the dropped aqueous sodium hydroxide solution increased, the return of the pH tended to be slower. Polymer particles suspended in the solution were gradually solubilized, and when the amount of the dropped aqueous sodium hydroxide solution reached 0.4 g, most of the polymer particles disappeared and the mixture became lightly yellow transparent. The pH of the solution was 6.2. This solution was concentrated to dryness, and the resultant yellowish brown solid was dissolved in methanol. Next, the solution was poured into acetonitrile for reprecipitation, thereby obtaining a white polymer solid. According to DMF-based GPC, the Mw and Mw/Mn of the thus obtained polymer were 9000 and 1.2, respectively.

PREPARATION EXAMPLE 6

Aspartic acid was heated at 220° C. for 2 hours in an oven under a nitrogen atmosphere to obtain a brown powder. According to NMR and IR measurements, it was confirmed that this brown powder was polysuccinimide. According to DMF-based GPC, Mw of the thus obtained polymer was 15,000.

EXAMPLE 1

To 38 g of poly(L-lactic acid) (PLA) having a weight average molecular weight Mw of 129000 determined by chloroform-based GPC was added 2 g of the aspartic acid-lactic acid copolymer (aspartic acid:lactic acid=1:5, Mw by DMF-based GPC=16000) obtained in Preparation Example 2. They were blended at 200° C. for 5 minutes by the use of a small-sized kneader. The resultant polylactic acid composition was subjected to thermal pressing at 190° C. to prepare a film.

The obtained film of the polylactic acid composition was colorless and transparent, and its Mw was 108000. The tensile strength of the film was 61 MPa, the tensile modulus of elasticity thereof was 1.1 GPa, and the elongation at breaking thereof was 10%. The above film was scarcely different in appearance and physical properties from a PLA film to which the aspartic acid-lactic acid copolymer was not added.

Several sheets of this film of the polylactic acid composition were immersed in a phosphate buffer solution of pH 7.3 put in a container with a cap, and the container was then placed in a constant temperature oven at 37° C. The film was taken out every predetermined time and then dried, and the tensile strength and Mw (chloroform-based GPC) were measured.

With the lapse of the immersion time, the film gradually whitened and became opaque. The tensile strength of the film was 48 MPa after 1 month, 40 MPa after 2 months, 26 MPa after 3.5 months, and 0 MPa after 5 months (the film was too brittle to measure). In addition, the Mw of the film was 87000 after 1 month, 75000 after 2 months, 51000 after 3.5 months, and 45000 after 5 months.

Since the polylactic acid was used in the form of the composition obtained by blending the polylactic acid itself with the aspartic acid-lactic acid copolymer, a hydrolysis rate could effectively be accelerated.

COMPARATIVE EXAMPLE 1

In the same manner as in Example 1 except that any aspartic acid-lactic acid copolymer was not added, 38 g of PLA having a weight average molecular weight Mw of 129000 determined by chloroform-based GPC were melted and stirred at 200° C. for 5 minutes by the use of a small-sized kneader, and the melt was then subjected to thermal pressing at 190° C. to prepare a film.

The pressed PLA film was colorless and transparent, and its Mw was 98000. The tensile strength of the film was 58 MPa, the tensile modulus of elasticity thereof was 1.1 GPa, and the elongation at breaking thereof was 8%.

In the same manner as described in Example 1, several sheets of this PLA film were immersed in a phosphate buffer solution of pH 7.3 put in a container with a cap, and the container was then placed in a constant temperature oven at 37° C. The film was taken out every predetermined time and then dried, and the tensile strength and the Mw (chloroform-based GPC) of the dried film were measured.

The tensile strength of the film was 62 MPa after 1 month, 58 MPa after 2 months, 57 MPa after 3.5 months, and 55 MPa after 5 months. Accordingly, even after 5 months, the strength of the film hardly lowered, and in addition, the film was still colorless and transparent and hence the appearance of the film scarcely changed.

The Mw of the film was 92000 after 1 month, 90000 after 2 months, 87000 after 3.5 months, and 80000 after 5 months. Accordingly, the decrease of the molecular weight was also slow. Furthermore, even after the lapse of 11 months, the weight retention ratio of the PLA film was 99%.

COMPARATIVE EXAMPLE 2

To 38 g of poly(L-lactic acid) (PLA) having a weight average molecular weight Mw of 129000 determined by chloroform-based GPC was added 2 g of polysuccinimide obtained in Preparation Example 6. They were blended at 200° C. for 5 minutes by the use of a small-sized kneader. The resultant polylactic acid composition was subjected to thermal pressing at 190° C. to prepare a film.

The obtained film of the polylactic acid composition was a non-homogeneous and opaque white-spotted film, and its Mw was 96000. The tensile strength of the film was 39 MPa, the tensile modulus of elasticity thereof was 1.8 GPa, and the elongation at breaking thereof was 5%. The appearance and the mechanical strength of the PLA film were remarkably impaired.

In the same manner as described in Example 1, several sheets of this PLA film were immersed in a phosphate buffer solution of pH 7.3 put in a container with a cap, and the container was then placed in a constant temperature oven at 37° C. The film was taken out every predetermined time and then dried, and the tensile strength and the Mw (chloroform-based GPC) of the dried film were measured.

The tensile strength of the film was 36 MPa after 1 month, 42 MPa after 2 months, 40 MPa after 3.5 months, and 38 MPa after 5 months. Accordingly, the strength of the film scarcely lowered.

In addition, the Mw of the film was 90000 after 1 month, 89000 after 2 months, 85000 after 3.5 months, and 82000 after 5 months. Accordingly, the decrease of the molecular weight was also slow.

EXAMPLE 2

To 38 g of PLA having a weight-average molecular weight Mw of 129000 determined by chloroform-based GPC was added 2 g of the aspartic acid-lactic acid copolymer (aspartic acid:lactic acid=1.4, Mw by DMF-based GPC=3400) obtained in Preparation Example 3, and they were blended at 200° C. for 5 minutes by the use of a small-sized kneader. The resultant polylactic acid composition was subjected to thermal pressing at 190° C. to prepare a film.

The obtained film of the polylactic acid composition was colorless and transparent, and its Mw was 97000. The tensile strength of the film was 59 MPa, the tensile modulus of elasticity thereof was 1.2 GPa, and the elongation at breaking thereof was 8%. The above film was scarcely different in appearance and physical properties from a PLA film to which the aspartic acid-lactic acid copolymer was not added.

Several sheets of this polylactic acid composition film were weighed, and then immersed in a phosphate buffer solution at pH 7.3 and 37° C., as described in Example 1. The film was taken out every predetermined time and then dried. Afterward, the tensile strength, the Mw (chloroform-based GPC) and the weight retention ratio of each film were measured.

With the lapse of the immersion time, the film gradually whitened and became opaque. The tensile strength of the film was 40 MPa after 1 month, 25 MPa after 2 months, 0 MPa after 3.5 months, and 0 MPa after 5 months.

In addition, the Mw of the film was 67000 after 1 month, 42000 after 2 months, 27000 after 3.5 months, and 24000 after 5 months.

Furthermore, the weight retention ratio of the film was 99% after 1 month, 99% after 2 months, 97% after 3.5 months, and 90% after 5 months.

Since the polylactic acid was used in the form of the composition obtained by blending the polylactic acid itself with the aspartic acid-lactic acid copolymer, a hydrolysis rate could effectively be accelerated.

EXAMPLE 3

To 39 g of PLA having a weight-average molecular weight Mw of 111000 determined by chloroform-based GPC was added 1 g of the aspartic acid-lactic acid copolymer (aspartic acid:lactic acid=1:4, Mw by DMF-based GPC=9400) obtained in Preparation Example 1, and they were blended at 200° C. for 5 minutes by the use of a small-sized kneader. The resultant polylactic acid composition was subjected to thermal pressing at 190° C. to prepare a film.

The obtained film of the polylactic acid composition was colorless and transparent, and its Mw was 93000. The tensile strength of the film was 62 MPa, the tensile modulus of elasticity thereof was 1.2 GPa, and the elongation at breaking thereof was 8%. The above film was scarcely different in appearance and physical properties from a PLA film to which the aspartic acid-lactic acid copolymer was not added.

Several sheets of this polylactic acid composition film were weighed, and then immersed in a phosphate buffer solution at pH 7.3 and 37° C., as described in Example 1. The film was taken out every predetermined time and then dried. Afterward, the tensile strength, the Mw (chloroform-based GPC) and the weight retention ratio of each film were measured.

With the lapse of the immersion time and after about 1 month, the film gradually whitened and became opaque. After about 5 months, the tensile strength of the film was substantially 0, and hence the film was brittle, white and opaque.

The Mw of the film was 45000 after 5 months, 24000 after 7 months, 15000 after 9 months, and 15000 after 11 months.

Furthermore, the weight retention ratio of the film was 99% after 5 months, 93% after 7 months, 88% after 9 months, and 82% after 11 months.

Since the polylactic acid was used in the form of the composition obtained by blending the polylactic acid itself with the aspartic acid-lactic acid copolymer, a hydrolysis rate could effectively be accelerated.

EXAMPLE 4

To 39 g of PLA having a weight-average molecular weight Mw of 111000 determined by chloroform-based GPC was added 1 g of the aspartic acid-lactic acid copolymer (aspartic acid:lactic acid=1:4, Mw by DMF-based GPC=9000) obtained in Preparation Example 5, and they were blended at 200° C. for 5 minutes by the use of a small-sized kneader. The resultant polylactic acid composition was subjected to thermal pressing at 190° C. to prepare a film.

The obtained film of the polylactic acid composition was slightly white and transparent, and its Mw was 82000. The tensile strength of the film was 62 MPa, the tensile modulus of elasticity thereof was 1.1 GPa, and the elongation at breaking thereof was 8%. The above film was scarcely different in appearance and physical properties from a PLA film to which the aspartic acid-lactic acid copolymer was not added.

Several sheets of this polylactic acid composition film were weighed, and then immersed in a phosphate buffer solution at pH 7.3 and 37° C., as described in Example 1. The film was taken out every predetermined time and then dried. Afterward, the tensile strength, the Mw (chloroform-based GPC) and the weight retention ratio of each film were measured.

After 1 day of the immersion, the film already whitened and became opaque. After the lapse of about 5 months, the strength of the film was about 0, and hence the film was brittle, white and opaque.

The Mw of the film was 41000 after 5 months, 25000 after 7 months, 17000 after 9 months, and 17000 after 11 months.

Furthermore, the weight retention ratio of the film was 97% after 5 months, 95% after 7 months, 91% after 9 months, and 90% after 11 months.

Since the polylactic acid was used in the form of the composition obtained by blending the polylactic acid itself with the aspartic acid-lactic acid copolymer, a hydrolysis rate could effectively be accelerated.

EXAMPLE 5

To 36 g of PLA having a weight-average molecular weight Mw of 129000 determined by chloroform-based GPC was added 4 g of the aspartic acid-lactic acid copolymer (aspartic acid:lactic acid=1:10, Mw by DMF-based GPC=36000) obtained in Preparation Example 4, and they were blended at 200° C. for 5 minutes by the use of a small-sized kneader. The resultant polylactic acid composition was subjected to thermal pressing at 190° C. to prepare a film.

The obtained film of the polylactic acid composition was colorless and transparent, and its Mw was 102000. The tensile strength of the film was 58 MPa, the tensile modulus of elasticity thereof was 1.0 GPa, and the elongation at breaking thereof was 11%. The above film was scarcely different in appearance and physical properties from a PLA film to which the aspartic acid-lactic acid copolymer was not added.

Several sheets of this polylactic acid composition film were weighed, and then immersed in a phosphate buffer solution of pH 7.3 and 37° C., as described in Example 1. The film was taken out every predetermined time and then dried. Afterward, the tensile strength and the Mw (chloroform-based GPC) of each film were measured.

With the lapse of an immersion time, the film gradually whitened and became opaque. The tensile strength of the film was 42 MPa after 1 month, 36 MPa after 2 months, 28 MPa after 3.5 months, and 12 MPa after 5 months.

Furthermore, the Mw of the film was 81000 after 1 month, 72000 after 2 months, 50000 after 3.5 months, and 45000 after 5 months.

Since the polylactic acid was used in the form of the composition obtained by blending the polylactic acid itself with the aspartic acid-lactic acid copolymer, a hydrolysis rate could effectively be accelerated.

EXAMPLE 6

To 0.95 g of poly(ε-caprolactone) (PCL) having a weight-average molecular weight Mw of 134000 determined by chloroform-based GPC was added 0.05 g of aspartic acid-lactic acid copolymer (aspartic acid:lactic acid=1:5, Mw=24000 by DMP-based GPC) obtained in the same manner as described in Preparation Example 2, and the resultant mixture was then dissolved in 9 g of chloroform. The solution was cast onto a petri dish, and chloroform was then gradually removed by drying to thereby prepare a film of a PCL composition containing 5% of the aspartic acid-lactic acid copolymer.

This PCL composition film was immersed in a phosphate buffer solution of pH 7.3 put in a container with a cap, and this container was then placed in a constant temperature oven at 37° C.

After 1 month, the film was taken out and then dried, and the Mw (chloroform-based GPC) of the film was determined and as a result, it was 110000. As understood from comparison with Comparative Example 3, the hydrolysis of the PCL in water was extremely slow. However, since there was used the composition obtained by blending the PCL with the aspartic acid-lactic acid copolymer, a hydrolysis rate could effectively be accelerated.

COMPARATIVE EXAMPLE 3

In the same manner as in Example 6 except that any aspartic acid-lactic acid copolymer was not added, 1.0 g of PCL having a weight-average molecular weight Mw of 134000 determined by chloroform-based GPC was dissolved in chloroform. The resultant solution was cast onto a petri dish, and the chloroform was then gradually removed by drying to prepare a PCL film containing no aspartic acid-lactic acid copolymer.

This PCL film was immersed in a phosphate buffer solution of pH 7.3 put in a container with a cap, and the container was then placed in a constant temperature oven at 37° C.

After 1 month, the film was taken out and then dried, and the Mw (chloroform-based GPC) of the film was measured. As a result, it was 134000, which indicated that the film was scarcely degraded.

EXAMPLE 7

3.8 g of poly(L-lactic acid) (PLA) having a weight-average molecular weight Mw of 283000 determined by chloroform-based GPC and containing 150 ppm of tin as the residue of a polymerization catalyst were dissolved in 20 ml of chloroform. Then, 0.2 g of the aspartic acid-lactic acid copolymer (aspartic acid:lactic acid=1:5, Mw=16000) obtained in Preparation Example 2 was added thereto, followed by mixing and dissolving. The resultant solution was cast onto a petri dish, and chloroform was then gradually removed by drying to prepare a film of a polylactic acid composition containing 5% of the aspartic acid-lactic acid copolymer.

This polylactic acid composition film was placed in a test tube, and the test tube was then immersed in an oil bath at 220° C. for a predetermined period of time.

The Mw (chloroform-based GPC) of the film was 211000 after 1 hour, 17500 after 2 hours, and 13100 after 3 hours. The weight loss of the sample by thermal degradation after 1 hours was 0.4%.

Since the polylactic acid was used in the form of the composition obtained by blending the polylactic acid itself with the aspartic acid-lactic acid copolymer, a hydrolysis rate could effectively be accelerated.

COMPARATIVE EXAMPLE 4

4.0 g of poly(L-lactic acid) (PLA) having a weight-average molecular weight Mw of 283000 determined by chloroform-based GPC and containing 150 ppm of tin as the residue of a polymerization catalyst was dissolved in 20 ml of chloroform. The resultant solution was cast onto a petri dish, and chloroform was then gradually removed by drying to prepare a PLA film.

This PLA film was placed in a test tube, and the test tube was then immersed in an oil bath at 220° C. for a predetermined period of time.

The Mw (chloroform-based GPC) of the sample was 142000 after 1 hour, 63000 after 2 hours, and 44000 after 3 hours. The weight loss of the sample by thermal degradation after 1 hour was 5.6%.

EXAMPLE 8

50 g of polyethylene powder (trade name EVOLUE SP0540 made by Mitsui Chemicals, Inc.) were blended with 2.5 g of the aspartic acid-lactic acid copolymer (aspartic acid:lactic acid=1:5, Mw=16,300 in DMF) obtained in Preparation Example 2, while they being ground in a mortar. The resultant mixture was thermally pressed at 160° C. to prepare a film. The obtained film was light brown transparent. The aspartic acid-lactic acid copolymer and the polyester could be mixed with each other without separation. In addition, a contact angle to water on the film was determined, and it was 72°.

COMPARATIVE EXAMPLE 5

In the same manner as in Example 8 except that any aspartic acid-lactic acid copolymer was not added, 50 g of polyethylene powder were thermally pressed at 170° C. to prepare a polyester film. The obtained film was transparent. A contact angle to water on this film was determined, and it was 78°.

EXAMPLES 9 and 10

The same manners as in Example 8 except that polycarbonate powder (trade name L-1250wp made by TEIZIN Inc.) was used in Example 9, and ground material of clear flake (made by YONO PET BOTTLE RECYCLE Inc.) was used in Example 10, were conducted. The results are shown in Table 2.

COMPARATIVE EXAMPLES 6 and 7

The same manners as in Comparative Example 5 except that polycarbonate powder (trade name L-1250wp made by TEIZIN Inc.) was used in Comparative Example 6, and ground material of clear flake (made by YONO PET BOTTLE RECYCLE Inc.) was used in Comparative Example 7, were conducted. The results are shown in Table 2.

TABLE 1

| | Hydrophilic segment unit | Hydrophobic segment unit | (a-1)/(a-2) | Mw |
|---|---|---|---|---|
| Pre. Ex. 1 | L-Asp | L-LTD | 1/3.9 | 9400 |
| Pre. Ex. 2 | L-Asp | L-LTD | 1/5.1 | 16300 |
| Pre. Ex. 3 | L-Asp | L-LA | 1/4 | 3400 |
| Pre. Ex. 4 | L-Asp | L-LTD | 1/10.4 | 36000 |
| Pre. Ex. 5 | Hydrolyzed one in Pre. Ex. 1 | | — | 9000 |
| Pre. Ex. 6 | L-Asp | — | — | 15000 |

L-Asp; L-Aspratic acid, L-LTD: L-Lactide

TABLE 2

| | Copolymer (component A) | (a-1)/(a-2) | Resin (component B) | A/B | Mixing state of A and B | Contact angle |
|---|---|---|---|---|---|---|
| Ex. 1 | Pre. Ex. 2 | 1/5 | PLA (Mw = 129,000) | 2/38 | ◎ | 72 |
| Ex. 2 | Pre. Ex. 3 | 1/4 | PLA (Mw = 129,000) | 2/38 | ◎ | 73 |
| Ex. 3 | Pre. Ex. 1 | 1/3.9 | PLA (Mw = 111,000) | 1/39 | ◎ | 73 |
| Ex. 4 | Pre. Ex. 5 | 1/3.9 | PLA (Mw = 111,000) | 1/39 | ◎ | 64 |
| Ex. 5 | Pre. Ex. 4 | 1/10.4 | PLA (Mw = 129,000) | 4/36 | ◎ | 72 |
| Ex. 6 | Pre. Ex. 2 | 1/5.1 | POL (Mw = 134,000) | 0.05/0.95 | ○ | 73 |
| Ex. 7 | Pre. Ex. 2 | 1/5.1 | PLA (Mw = 283,000 with Sn 150 ppm) | 0.2/3.8 | ◎ | 72 |
| Ex. 8 | Pre. Ex. 2 | 1/5.1 | PE | 2.5/50 | ○ | 78 |
| Ex. 9 | Pre. Ex. 2 | 1/5.1 | PC | 2.5/50 | ○ | 84 |
| Ex. 10 | Pre. Ex. 2 | 1/5.1 | PET | 2.5/50 | △ | 77 |
| Com. Ex. 1 | — | — | PLA (Mw = 129,000) | — | — | 79 |
| Com. Ex. 2 | — | 1/0 | PLA (Mw = 129,000) | 2/38 | △ | 79 |
| Com. Ex. 3 | — | — | PCL (Mw = 134,000) | — | — | 78 |
| Com. Ex. 4 | — | — | PLA (Mw = 283,000 with Sn 150 ppm) | — | — | 80 |
| Com. Ex. 5 | — | — | PE | — | — | 90 |
| Com. Ex. 6 | — | — | PC | — | — | 88 |
| Com. Ex. 7 | — | — | PET | — | — | 81 |

As apparent from the above results, the addition of the copolymer (A) permits the production of a resin composition in which wettability and degradability can be improved and heat deterioration can be inhibited.

What is claimed is:

1. A resin composition comprising a block or a graft copolymer (A) having a polyamino acid as a hydrophilic segment (a-1) and a degradable polymer as a hydrophobic segment (a-2), and a resin (B) wherein the hydrophilic segment (a-1) of the copolymer (A) comprises a constitutional unit derived from aspartic acid, the hydrophobic segment (a-2) comprises a constitutional unit derived from a hydroxycarboxylic acid, a lactide or a lactone, and the resin (B) is an aliphatic polyester.

2. The resin composition according to claim 1, wherein the composition ratio by weight of the copolymer (A) to the resin (B) [(A)/(B)] is in a range of [1/99] to [33/67].

3. The resin composition according to claim 1, wherein the resin (B) is the degradable resin.

4. The resin composition according to claim 1, wherein the hydrophobic segment (a-2) of the copolymer (A) comprises a constitutional unit derived from lactic acid, glycolic acid, lactide, glycolide or ε-caprolactone.

5. The resin composition according to claim 1, wherein the weight-average molecular weight of the copolymer (A) is in a range of 1,000 to 100,000.

6. The resin composition according to claim 1, wherein the ratio of the hydrophilic segment (a-1) to the hydrophobic segment (a-2) [(a-1)/(a-2)] is in a range of [1/1] to [1/50].

7. The resin composition according to claim 1, wherein the copolymer (A) is a copolymer which is obtained by heating a mixture of aspartic acid and at least one selected from the group consisting of hydroxycarboxylic acids, lactides and lactones and which has a succinimide unit and/or an aspartic acid unit and a hydroxycarboxylic acid unit as repeating constitutional units.

8. The resin composition according to claim 1, wherein the copolymer (A) is a copolymer which is obtained by heating a mixture of aspartic acid and at least one selected from the group consisting of lactic acid, glycolic acid, lactide, glycolide and ε-caprolactone and which has a succinimide unit and/or an aspartic acid unit and a hydroxycarboxylic acid unit as repeating units.

9. The resin composition according to claim 1, wherein the copolymer (A) has both of a succinimide unit represented by the following formula (1) as the repeating unit of the hydrophilic segment (a-1) and a hydroxycarboxylic acid unit represented by the following formula (2) as the repeating unit of the hydrophobic segment (a-2):

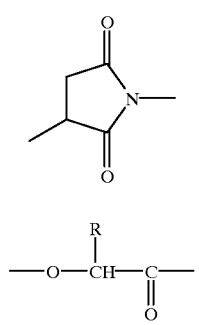

(1)

(2)

wherein, in the formula (2), R is a methyl group or a hydrogen atom.

10. The resin composition according to claim 1, wherein the hydrophilic segment (a-1) of the copolymer (A) is a polysuccinimide segment represented by the following formula (3), and the hydrophobic segment (a-2) is a polyhydroxycarboxylic acid segment represented by the following formula (4), and the ratio of the succinimide unit in the copolymer (A) is in a range of 1 to 33 mol % and the ratio of the hydroxycarboxylic acid unit is in a range of 67 to 99 mol %:

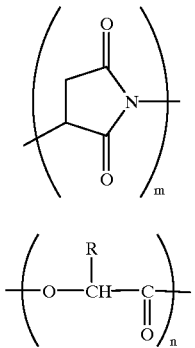

(3)

(4)

wherein, in the formula (3), m is a value of from 1 to 100; and in the formula (4), R is a methyl group or a hydrogen atom, and n is a value of from 1 to 1,000.

11. The resin composition according to claim 1, wherein the copolymer (A) is a branched copolymer having all of a segment (a-1-1) represented by the following formula (5), a segment (a-1-2) represented by the following formula (6) and a polyhydroxycarboxylic acid segment (a-2-1) represented by the following formula (7) as the hydrophilic segment (a-1);

the ratio of a unit derived from aspartic acid represented by the formula (8) in the copolymer (A) is in a range of 1 to 33 mol %, and the ratio of hydroxycarboxylic acid unit is a range of 67 to 99 mol %, and the molecular terminal of the copolymer (A) comprises at least one group selected from the group consisting of an amino group, a hydroxyl group, a carboxyl group and a salt of a carboxylic acid:

(5)

(6)

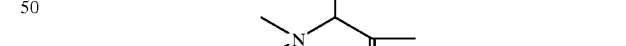

(7)

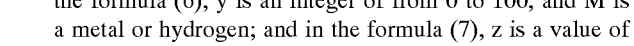

(8)

wherein, in the formula (5), x is a value of from 0 to 100; in the formula (6), y is an integer of from 0 to 100, and M is a metal or hydrogen; and in the formula (7), z is a value of from 2 to 1,000, and R is a methyl group or hydrogen).

* * * * *